United States Patent [19]

Harvey et al.

[11] Patent Number: 5,383,027
[45] Date of Patent: Jan. 17, 1995

[54] PORTRAIT PRINTER SYSTEM WITH DIGITAL IMAGE PROCESSING EDITING

[75] Inventors: Ronald B. Harvey, Eden Prairie; Jon A. Holmes, St. Louis Park; Keith A. Benson, Brooklyn Park, all of Minn.

[73] Assignee: Lifetouch National School Studios Inc., Minneapolis, Minn.

[21] Appl. No.: 842,569

[22] Filed: Feb. 27, 1992

[51] Int. Cl.⁶ ............... H04N 1/23; H04N 1/387; G03B 7/00; G03B 27/52; G06F 15/00
[52] U.S. Cl. ................. 358/296; 358/452; 358/302; 355/40; 355/202; 395/146; 354/290; 354/412
[58] Field of Search ........... 358/296, 302, 448, 452, 358/462, 75, 76, 80; 355/20, 32, 38, 40, 44, 54, 77, 202; 354/75, 76, 77, 106, 109, 290, 354, 412; 395/115, 116, 145–147, 153, 155

[56] References Cited

U.S. PATENT DOCUMENTS

| | | | |
|---|---|---|---|
| 3,673,933 | 7/1972 | Hamann | 95/1.1 |
| 4,139,292 | 2/1979 | Chiesa | 354/109 |
| 4,394,089 | 7/1983 | McIntosh et al. | 355/88 |
| 4,572,634 | 2/1986 | Livingston et al. | 354/84 |
| 4,583,186 | 4/1986 | Davis et al. | 364/526 |
| 4,589,766 | 5/1986 | Fürsich et al. | 355/38 |
| 4,591,904 | 5/1986 | Urabe et al. | 358/75 |
| 4,642,683 | 2/1987 | Alkofer | 358/80 |
| 4,642,684 | 2/1987 | Alkofer | 358/80 |
| 4,663,663 | 5/1987 | Lee | 358/80 |
| 4,676,628 | 6/1987 | Asbury, III | 355/38 |
| 4,690,548 | 9/1987 | Holm | 355/77 |
| 4,712,909 | 12/1987 | Oshikoshi | 355/20 |
| 4,728,978 | 3/1988 | Inoue et al. | 354/289.1 |
| 4,738,526 | 4/1988 | Larish | 354/412 |
| 4,769,694 | 9/1988 | Oshikoshi | 358/65 |
| 4,811,042 | 3/1989 | Cloutier et al. | 354/410 |
| 4,835,563 | 5/1989 | Larish | 354/412 |
| 4,862,200 | 8/1989 | Hicks | 354/75 |
| 4,903,068 | 2/1990 | Shiota | 355/68 |
| 4,951,233 | 8/1990 | Fujiwara et al. | 395/146 |
| 4,984,013 | 1/1991 | Terashita | 355/38 |
| 4,992,824 | 2/1991 | Plummer | 355/38 |
| 5,001,653 | 3/1991 | Buchanan et al. | 395/146 |
| 5,021,820 | 6/1991 | Robison et al. | 355/40 |
| 5,027,197 | 6/1991 | Endo | 358/76 |
| 5,029,312 | 7/1991 | Goenner | 355/38 |
| 5,032,866 | 7/1991 | Shoden et al. | 355/38 |
| 5,051,770 | 9/1991 | Cornuejols | 354/412 X |
| 5,109,281 | 4/1992 | Kobari et al. | 358/296 |
| 5,148,196 | 9/1992 | Spector | 354/75 |
| 5,180,906 | 1/1993 | Yamada | 355/20 X |
| 5,223,891 | 6/1993 | Fierstein et al. | 355/77 |
| 5,227,835 | 7/1993 | Anagnostopoulos | 354/412 |
| 5,235,680 | 8/1993 | Bijnagte | 395/147 X |

Primary Examiner—Benjamin R. Fuller
Assistant Examiner—Eric Frahm
Attorney, Agent, or Firm—Haugen and Nikolai

[57] ABSTRACT

A portraiture printer system receives portrait film which carries portrait images provided by a portraiture camera. A frame grabber receives portrait images carried on the film and converts them into digitized images. An edit station processes the digitized images. The edit station manipulates the sequence of the images and their composition. A printer receives the digitized images and prints the digitized images on an image recording medium.

18 Claims, 4 Drawing Sheets

PORTRAIT PRINTER SYSTEM WITH DIGITAL IMAGE PROCESSING EDITING

BACKGROUND OF THE INVENTION

The present invention relates to portraiture printing. In particular, the present invention relates to printing photographic portraits by digitally scanning film negatives, processing scanned negatives, and printing scanned negatives.

Portraiture cameras are used for taking portraits of individuals and groups. For example, Hopson U.S. Pat. No. 4,422,745 entitled "Camera System" discloses a portrait camera system and is incorporated herein by reference. The camera system is used to take portraits of a large number of individuals such as students for school pictures. The camera system records bar code information on the exposed film along each image. The bar code information relates, for instance, to order information, student number, and the like. This information can be used to control the number and size of print (or product) produced. The student number is used to aid in distribution of prints.

The camera system of Hopson patent substantially reduces the labor required of a photographer to record information relating to orders and student numbers. However, film produced by the camera system of Hopson is still printed on photographic paper using standard printing techniques in which light is shined through the film negative to image the portrait on the photographic paper.

Further automation of the photographic process is important in portraiture printing to speed production, reduce costs, and improve accuracy. One such system is described in Goenner U.S. Pat. No. 5,029,312 entitled "Automatic Portraiture Printer Control System" which is incorporated herein by reference. The Goenner patent describes an automated printing system in which subject is identified within a portrait image. This information is used during the printing process to control printing of the subject.

SUMMARY OF THE INVENTION

The present invention is a portraiture printer system and method which provides a wide range of control over the printing process. The portraiture printer system of the present invention uses a portrait source (such as a film original) obtained from a portrait camera. The portrait film original is scanned into the printer system using a frame grabber which provides a digital portrait output. A crosstalk elimination filter is used when the image is scanned to eliminate crosstalk between output signals which represent the red, green, and blue components of the image. Dynamic range of the frame grabber is adjusted based upon the dynamic range of the film original. An edit station processes the digital portrait output. The processing includes placing portraits into a predetermined sequence, forming composite images by combining a number of portraits into a single image and adding additional text or graphics. The digital portrait output is printed by a printer. The printer transfers the scanned portrait onto a sensitized medium such as photographic film, paper, or other image recording medium. The spectral composition of the scanned image is adjusted to compensate for differences between the sensitivity of the medium and the characteristic light output of the printer.

DETAILED DESCRIPTION OF THE PREFERRED EMBODIMENT

Figure 1:
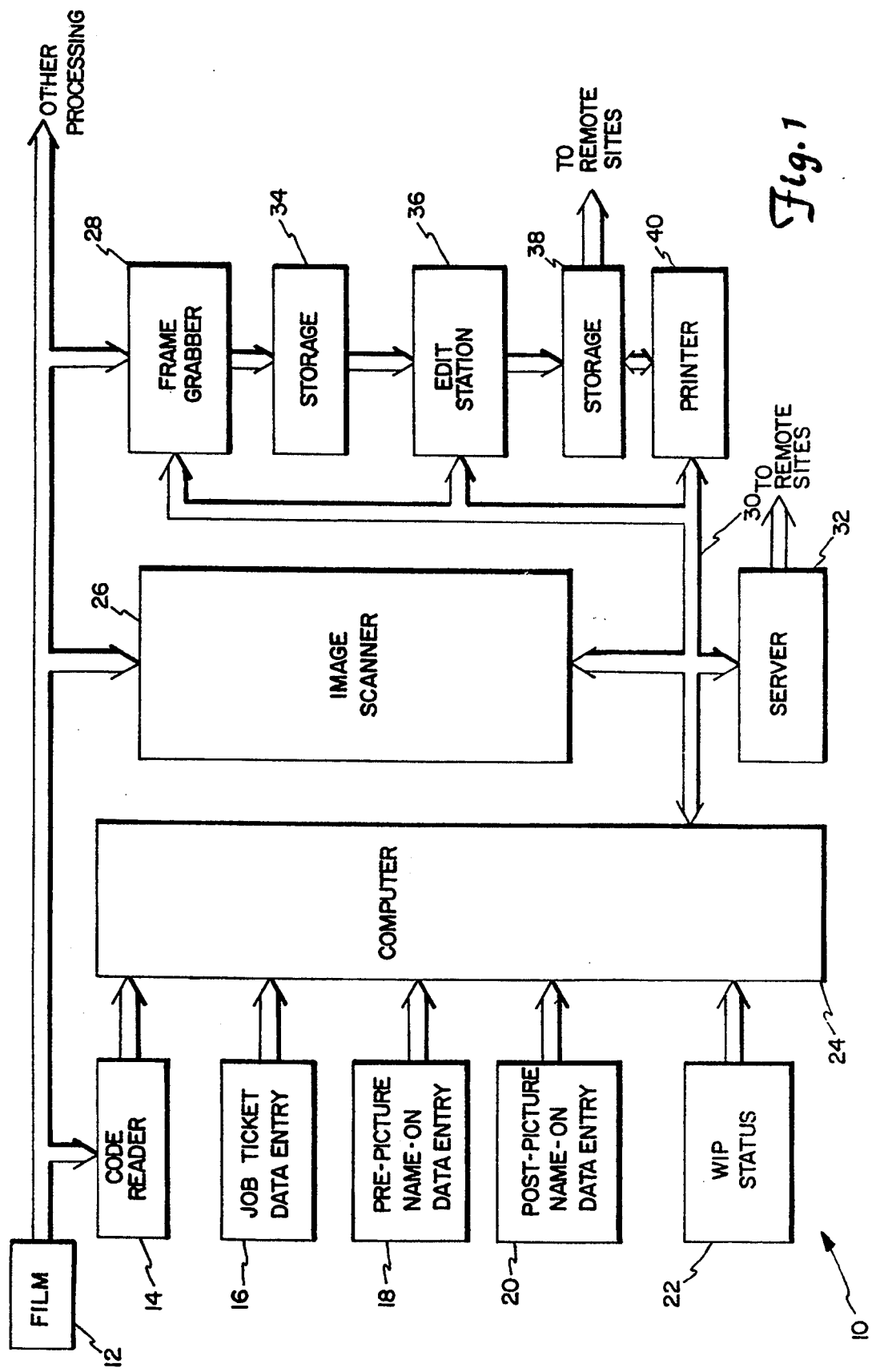
FIG. 1 is a block diagram of a portraiture printer system in accordance with the present invention.

FIG. 1 is a block diagram of an automatic portraiture printer system 10 in accordance with the present invention. Automatic portraiture printer system 10 receives exposed photographic film 12. Film 12 typically comprises a roll of negatives from a portrait camera. Automatic printer system 10 includes code reader 14, job ticket data entry input 16, pre-Picture Day name-on data entry input 18, post-Picture Day name-on data entry input 20 and work-in-progress status input 22 which are connected to computer 24. (Picture Day refers to the day on which the portrait is actually taken. "Name-on" is also called "name-under" and refers to a name carried next to the image.) In a preferred embodiment, code reader 14 comprises a bar code reader for reading bar codes stored on film 12. Image scanner 26 is positioned adjacent film 12 to scan film 12. Frame grabber 28 is also positioned adjacent film 12 to scan film 12. Computer 24 is connected to data bus 30. Image scanner 26 and frame grabber 28 are also connected to data bus 30. Server 32 is connected to data bus 30. Storage 34 is coupled to frame grabber 28. Edit station 36 is coupled to storage 34 and data bus 30. Storage 38 is connected to edit station 36. (Storage 38 can also comprise a computer network.) Printer 40 connects to storage 38 and data bus 30.

In operation, portrait film 12 passes through portrait printer system 10. Bar code information carried on film 12 is read by code reader 14 and provided to computer 24. Computer 24 also receives input from job ticket data entry input 16 which reads a job ticket. (A job ticket contains data related to a portrait carried on film 12.) Data input to computer 24 is also provided data entry inputs 18 and 20. Computer 24 has access to work-in-progress information from work-in-progress status input 22. Computer 24 is coupled to a data bus 30. Data bus 30 allows this relational data base information to be transferred within portraiture printer system 10. Data which is provided to computer 24 through inputs 14, 16, 18, and 20 includes but is not necessarily limited to data relating to the subject photographed, including such things as student name, customer order information, school order information (such as services, delivery date, etc.), subject address, phone number, school name, grade, information related to film 12 and information related to photographic conditions during exposure of film 12.

Image scanner 26 scans portraits carried on film 12 and collects information such as color density. Operation of image scanner 26 is described in the Goenner U.S. Pat. No. 5,029,319 which is assigned to the same Assignee and incorporated herein by reference. Information from image scanner 26 is provided to data bus 30. Server 32 acts as a network file server and is coupled to data bus 30.

Frame grabber 28 is positioned for scanning negatives carried on film 12. Frame grabber 28 is connected to data bus 30. Frame grabber 28 scans negatives on film 12 and provides a digitized output to storage 34. The digitized output is an output in which the image is represented in a digital format. Edit station 36 accesses digitized images stored in storage 34 for processing. Edit station 36 provides digitized images to storage 38. Images stored in storage 38 can be transferred to remote locations. For example, schools can obtain copies of digitized images of their students. Printer 40 obtains digitized images from storage 38 and transfers the images to photographic paper or other sensitized medium.

Figure 2:
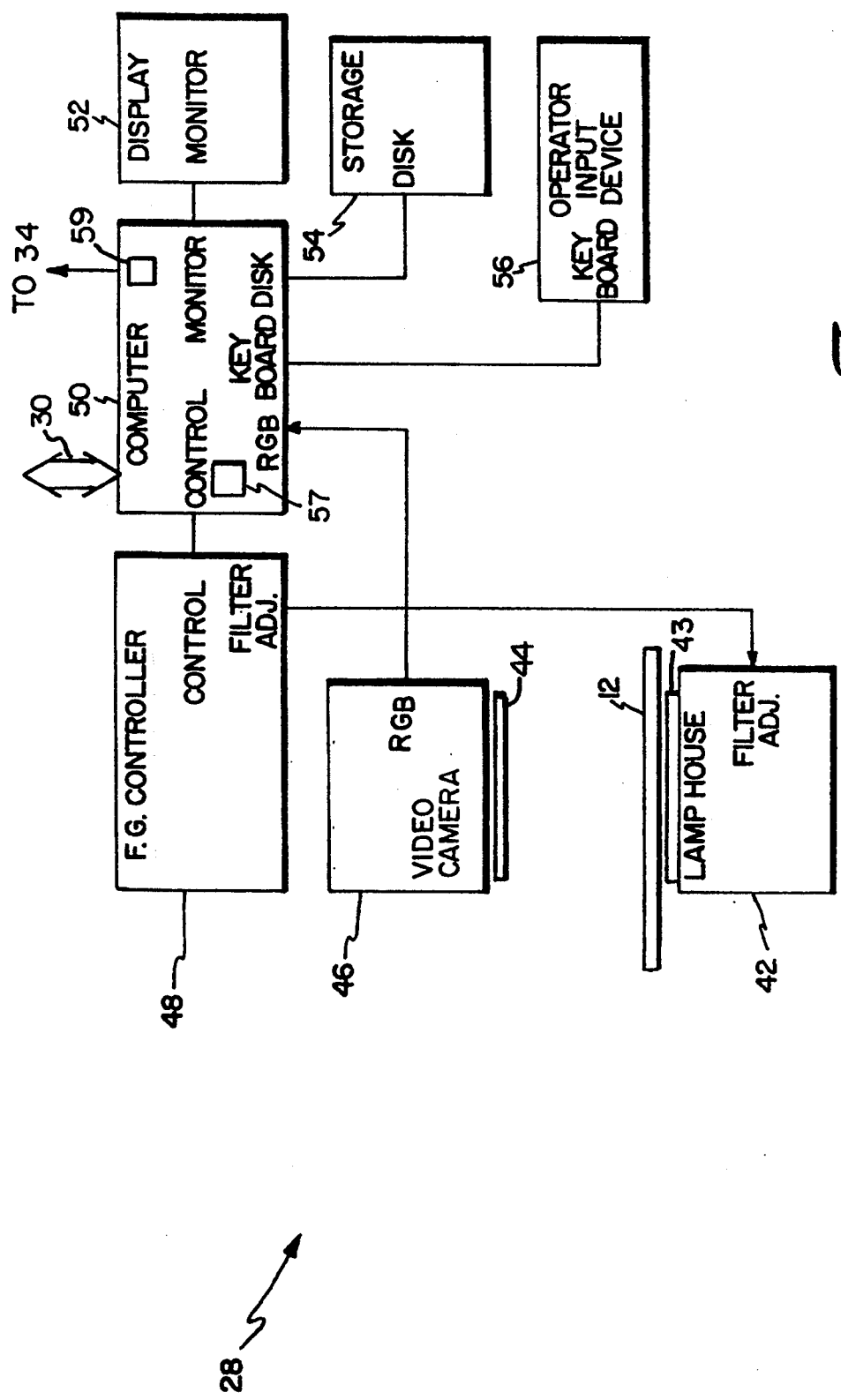
FIG. 2 is a block diagram of a frame grabber used in the portraiture printer system of FIG. 1.

FIG. 2 shows a block diagram of frame grabber 28. Frame grabber 28 includes lamp house 42, film drive 43, crosstalk elimination filter 44, video camera 46, controller 48, computer 50, display 52, storage 54, and operator input device 56. (Alternatively, frame grabber 28 can comprise a film scanner.) Lamp house 42 is positioned adjacent film 12. Video camera 46 is coupled to computer 48 and positioned adjacent film 12 on the opposite side of film 12 from lamp house 42. Lamp house 42 is also connected to controller 48. Crosstalk elimination filter 44 is positioned between video camera 46 and film 12. Computer 50 is connected to controller 48 and video camera 46. Computer 50 is also connected to display 52, storage 54, and operator input device 56. In a preferred embodiment, video camera 46 comprises a KY-F30 camera available from JVC Corporation. Computer 50 includes an analog-to-digital convertor 57 for converting analog images provided by video camera 46 into digitized images. Computer 59 also includes an image compression board 59 for compressing the size of digitized images. In a preferred embodiment, convertor 57 comprises a NuVista board available from Truvision of Indianapolis, Ind.

In operation, negatives on portrait film 12 are illuminated by lamp house 42. Film drive 43 moves film 12 through frame grabber 28. The spectral output of lamp house 42 is adjusted by frame grabber controller 48. Crosstalk elimination filter 46 changes the spectrum of light received by video camera 46. Filter 46 is such that the spectrum of light reaching camera 46 has red, green, and blue elements which do not overlap. Video camera 46 is positioned over film strip 12 to scan portraits carried on film strip 12. Video camera 46 provides a video RGB signal to computer 50. Additionally, frame grabber controller 48 adjusts filters contained in lamp house 42 to obtain a desired spectral output from lamp house 42. Feed back is provided through video camera 46. This spectral output is such that video camera 46 will provide a desired video output representing light transmitted through film 12 for a given input. Frame grabber controller 48 is controlled by computer 50. Computer 50 is coupled to keyboard 56 which acts as an operator input device. Computer 50 stores and retrieves information from storage 54. Information is provided to an operator from computer 50 through display monitor 52. Computer 50 is also connected to storage 34 shown in FIG. 1. Scanned images are provided to computer 50 in RGB (component video) format. Computer 50 digitizes the scanned images for storage in storage device 34 using analog-to-digital convertor 57. Computer 50 can compress the digitized images with compression board 59. Frame grabber controller 48 adjusts the dynamic range of video camera 46 to obtain a desired match with the dynamic range of negatives carried on portrait film 12. The dynamic range of the digitizing process can be adjusted in a number of ways: control of lamp house 42, control of the aperture of camera 46 or by changing the level of the RGB video signal output by camera 46.

The spectral output of lamp house 42 is adjusted to match the sensitivity of camera 46 to red, green, and blue light. Crosstalk elimination filter 44 modifies the light reaching camera 46 so that the spectrum is confined to red, green, and blue light which matches the sensitivity of camera 46. This eliminates crosstalk between the red, green, and blue signal elements in the output of camera 46.

In a preferred embodiment of the present invention, video camera 46 is used as an input device. Video cameras are advantageous because they operate at high speed and are easily available "off the shelf." Additionally, video camera are well suited for continuous feed operation. Furthermore, all of the color signals are presented simultaneously, every 1/30th of a second.

Figure 3:
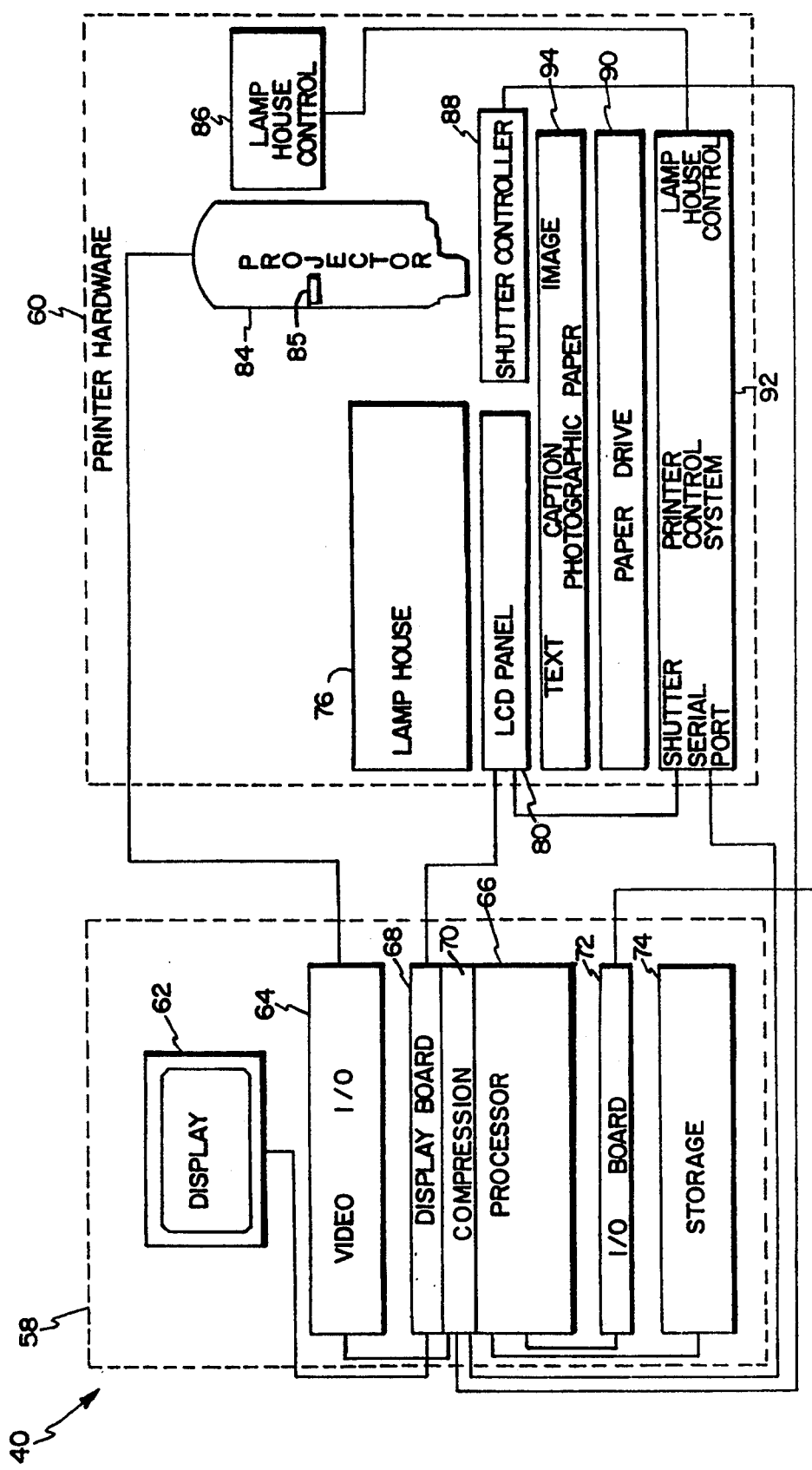
FIG. 3 is a block diagram of a printer used in the portraiture printer system of FIG. 1.

FIG. 3 is a block diagram of printer 40. Printer 40 includes master computer 58 and printer hardware 60. Computer 58 includes display 62, video I/O 64, processor 66, display 68, video compression board 70, I/O board 72, and storage 74.

Printer hardware 60 includes lamp house 76, LCD panel 80, projector 84, lamp house 86, shutter controller 88, paper drive 90, and printer control system 92. LCD panel 80 includes a shutter (not shown) connected to printer control system 92. In a preferred embodiment, projector 84 comprises an LC-150 LCD projector available from Eiki. Projector 84 can be eliminated so that LCD panel 80 is used to delivery information onto film 94. In a preferred embodiment, LCD projector 80 comprises a QA 1050 available from Sharp.

In computer 58, display 62 is coupled to processor 66. Video I/O 64 is coupled to processor 66. Processor 66 is connected to display board 68 and video compression board 70. I/O board 72 connects to processor 66 and computer 24 shown in FIG. 1. Storage 74 typically comprises a removable disk and is connected to processor 66. Storage 74 can also comprise a network.

Lamp house 76 is positioned adjacent LCD panel 80. Projector 84 is positioned over photographic paper 94 adjacent shutter controller 88. Projector 84 is connected to video I/O 64 of computer 58. Projector 84 comprises an LCD projector. Projector 84 receives light from lamp house 86. Lamp house 86 is connected to printer control system 92. Paper drive 90 operates on photographic paper 94. LCD panel 80 is connected to display board 68. Printer control system 92 connects to processor 66.

Printer 40 is used to print digitized images on photographic paper 94. Computer 58 obtains digitized images from storage 38 provided by frame grabber 28. Computer 58 includes a video I/O board 64 which converts the digitized images into an analog format and provides them to projector 84. Information is also provided to LCD panel 80 in a 24 bit format by video display board 68. LCD panel 80 and projector 84 are positioned over photographic paper 94 to expose photographic paper 94. Illumination of photographic paper 94 is provided by lamp houses 76 and 86. Projector 84 projects the image onto photographic paper 94. With projector 84, the image includes text, graphics, and continuous tone images. LCD panel 80 is used to provide additional text and graphics on photographic paper 94. Paper drive 90 advances photographic paper 94 in a path adjacent LCD panel 80 and projector 84. The spectral output of lamp house 86 is adjusted by printer control system 92.

Printer control system 92 is connected to processor 66 through a serial port.

Figure 4:
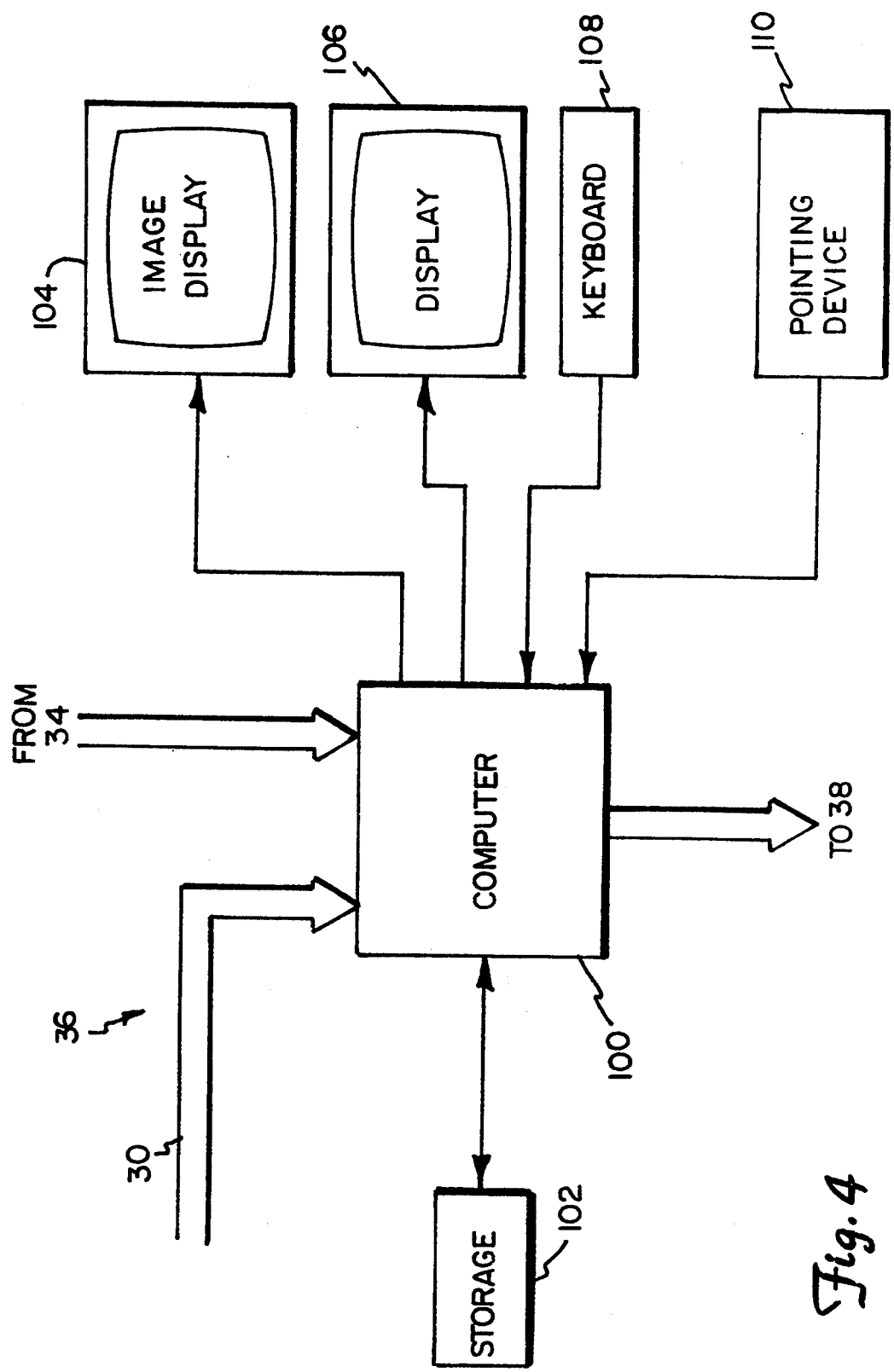
FIG. 4 is a block diagram of an edit station used in the portraiture printer system of FIG. 1.

FIG. 4 shows edit station 36. Edit station 36 includes computer 100 connected to storage 34 and storage 38. Computer 100 is also connected to a separate storage device 102. Image display 104 and display 106 are connected to computer 100. Edit station 36 includes keyboard 108 and pointing device 110 connected to computer 100 which provide operator inputs to computer 100. In a preferred embodiment, image display 104 is a high quality graphics display suitable for displaying color images.

Edit station 36 is positioned in the path between frame grabber 28 and printer 40. Edit station 36 is used to manipulate digitized images provided by frame grabber 28. Computer 100 of edit station 28 shown in FIG. 4 receives digitized images from storage 34. These digitized images are displayed on image display 104. Computer 100 accepts operator inputs from keyboard 108 and pointing device 110. Display 106 is used to provide information to an operator.

In operation, computer 100 performs various operations on digitized images. Computer 100 matches the digitized images with the name of the subject in the image and forms a linked data base. Computer 100 places, for example, the digitized images in a predetermined order such as alphabetical by reordering the linked list. The information on which the sort is based is obtained from computer 24. Computer 100 performs a sort algorithm in which the order of digitized images as stored in the linked list of the relational data base is reorganized so that images are printed in the desired order. (In contrast, in a prior art printer system, images were physically sorted so that the images had to be printed before they could be rearranged. This was labor intensive and resulted in errors.) Additionally, computer 100 can manipulate the content of the images. For example, composite images can be formed by grouping together a number of individual digitized images. Pointing device 110 is used by an operator for editing images displayed on image display 104.

Edit station 36 is used in accordance with the present invention to process digitized images provided by frame grabber 28 (or other sources). Edit station 36 shown in FIG. 4 performs numerous functions on digitized images based upon information provided through data bus 30 or input provided by an operator through keyboard 108 and pointing device 110.

Computer 100 retrieves information from image scanner 26 and computer 24 using bus 30. For example, computer 100 correlates a digitized image with the subject's name or other information relating to the portrait. Additionally, the digital images are sorted into any desired order. For example, the images are sorted according to name, class, purchase order, or any other desired sequence. The digital images are sorted with an algorithm performed by computer 100. In edit station 36, information relating to digitized portraits is associated with the appropriate digitized portrait using a linked list data base. Images are sorted into any desired order using a sort algorithm.

For example, to sort a group of portrait images, computer 100 obtains digitized images from storage 34 and information regarding the images from bus 30. The information may originate from, for example, code reader 14 or job ticket data entry input 16. An operator instructs computer 100 through keyboard 108 or pointing device 110 on what information (for example, the name of the subject) and what sequence is to be used to sort the images by revising the linked list data base. Computer 100 then sorts the images based upon this information. The images linked list data base and the data is written to storage 38 by computer 100.

The ability of the present invention to sort the order of images is a significant advancement over prior art systems. In a typical prior art system, sorting occurred manually, after the images were printed. This was time consuming and often resulted in errors. With the present invention, on the other hands the photographs are directly printed in the desired sequence.

Edit station 36 shown in FIG. 4 can group a number of digitized images together to form a "composite image." A composite image is a grouping of individual portraits to form a single picture. The composite image is formed by placing a number of individual portraits together to form a group shot. For example, a composite image of a school's football team or class can be formed by grouping together individual portraits of each team member. A composite photograph typically includes a caption (text) identifying individuals in the photo or the name of the school or year. The caption information is retrieved from computer 24 shown in FIG. 1. A subject's name is entered into system 10 through code reader 14, job ticket data entry input 16, pre-picture name-on data entry input 18, or post-picture name-on data entry input 20. To form composite images, computer 100 displays the selected images on a grid pattern on image display 104. Additionally, text to be printed on the composite image is entered by an operator from keyboard 108 or down loaded from computer 24. In one embodiment of the present invention, edit station 36 is coupled to a device for producing a photographic negative. The negative is used to make subsequent prints. Once a layout for the composite photograph has been produced, it can be stored on storage device 102 for later use. For example, if the composite image is incorrect and needs to be revised, an operator retrieves the stored image from storage device 102 and make minor changes.

For example, to form a composite image, edit station 36 retrieves the desired images from storage 34 along with information related to those images from bus 30 provided by job ticket data entry 16 and code reader 14. Computer 100 displays a grid on image display 104. An operator selects the desired text to be displayed with each image, such as the subject's name. This data is retrieved from computer 24 so that the operator is freed from manually entering each piece of data. The operator positions each image within the grid on image display 104 using pointing device 110. This step can also be performed automatically by computer 100. The operator can also enter captions using keyboard 108. When the composite image is complete, the image is passed to printer 40 for printing on photographic paper 94.

The present invention's ability to create composite images in edit station 36 is a significant advancement over the prior art. In the prior art, the portrait images had to be cut from the photographic film and physically grouped in the desired layout. This process destroyed the original negative. Furthermore, typically the photographer had to make sure that subjects appeared on a continuous piece of film. Additionally, the images had to be manually associated with the name of the subject. The prior art method was particularly cumbersome when one of the subjects was absent on the day the photographs were taken. Another technique involved is making positives of the images, cutting and grouping the positions, and making a new negative. Therefore, the prior art technique was time consuming and required the additional step of duplicating negatives. With the present invention, an operator is able to group images together on display 104 using keyboard 108 and pointing device 110 without damaging photographic film 12.

Edit station 36 is also used by an operator to select the appropriate image to be printed. For example, a photographer may take a number of photographs of the same subject. The operator can select the best photograph using the edit station. Additionally the operator can check the information provided by computer 24 with the actual information that appears on the image, such as the name of the subject. This provides an additional check that the data is associated with the correct image.

Edit station 36 is also used to group images into a directory format, such as a student directory. The directory can include, for example, a subject's name, address, and phone number next to the subject's portrait.

Many schools now own computer systems capable of displaying low resolution images. However, schools typically do not have a source for these images. Computer 100 in edit station 36 converts a high resolution image into a lower resolution image suitable for use with a school's computer system. Computer 100 organizes the images and groups the images with student information so that a school's database software can access the images. This information is written to computer disk or other storage medium for shipping to a school. Edit station 36 is also used to monitor the quality of images on film 12. Edit station 36 can analyze the quality of images on film 12 to ensure that they are adequate for printing. Using image processing software, an operator can use computer 100 to compensate for errors in the digitized images. For example, the color density can be altered and defects in the negative can be electronically "air brushed" out of the image.

Projector 84 comprises an Eiki LC-150 which includes color separation filters, optical sensors for each color, and a RGB interface board. Projector 84 includes a liquid crystal matrix 85 for defining an image. Lamp house 86 provides light which shines through the liquid crystal matrix on to photographic paper 94. Lamp house 86 is adjusted by printer control system 92 to provide the proper spectral output so that images from projector 84 provide the correct color balance and spectral density on photographic paper 94. Paper drive 90 propels photographic paper 94 through printer 40.

Computer 58 receives digitized images from edit station 36. The digitized images are converted into an RGB format by video I/O board 64 and provided to projector 84. Printer hardware 60 includes LCD panel 80 and caption fixture 82. LCD panel 80 and caption fixture 82 are used to provide additional information on photographic paper 94 adjacent the portrait image. The additional information includes name, address, bar code, grade, and school logo.

Printer 40 can be calibrated by outputting a known image to projector 84 and measuring the light output of projector 84. Calibration is accomplished by compensating the spectral output of the projector. This can be through adjustment of the spectral output of lamp house 86 or by appropriately adjusting the video signal provided to projector 84 by video I/O 64.

In typical prior art systems, the spectral output of the light source is modulated to provide an image. The use of CRTs to print images typically required special phosphors to achieve the desired spectral output. In contrast, with printer 40 of the present invention the spectral output of lamp house 76 (for example) is adjusted to match the sensitivity of the light sensitive medium (photographic paper 94) while a light transmissive element (LCD panel 80, for example) is modulated to form images on paper 94. The present invention has the advantage of matching spectral content to the paper through a means other than the element which forms the actual image. This allows greater control of the color density in the image printed on paper 94. Additionally, printer 40 in accordance with the present invention is used to map (i.e. convert) the discrete levels of the digitized image in a non-linear manner when the image is projected onto paper 94. This allows the color density to be optimized for the particular light sensitive medium used to record the image.

Turning now to printer 40, Printer 40 can make identification cards or index cards which carry a subject's picture. In this mode of operation, edit station 36 is used to view and design graphics associated with the ID card, such as school logos and captions. Additionally, edit station 36 can be used to select text, color, or bar codes to be applied to the ID card.

Printer 40 transfers digitized images to photographic paper 94. In a preferred embodiment, computer 58 comprises a Macintosh IIFX.

The present invention is a portrait printer system for transferring portrait originals to photographic paper. The system includes a frame grabber, an edit station and a printer. The frame grabber scans the film and converts portrait images on the film into a digital format. An edit station receives the digitized images and provides a means for processing the images. The edit station sorts the images and organizes them into composite images. Since the images are in a digital format, the edit station can exercise a wide range of control on the images. A printer converts the images from a digital format into an analog one for printing on photographic paper.

Although the present invention has been described with reference to preferred embodiments, workers skilled in the art will recognize that changes may be made in form and detail without departing from the spirit and scope of the invention. For example, portrait images can be provided by any suitable source such as from a portrait imaging system the directly provides a digital output. Furthermore, the image can be printed on any suitable sensitized medium or image recording device. Printed portraits include portrait images printed adjacent text or graphic information.

What is claimed is:

1. A system for printing developed portrait film previously exposed by a portrait camera, said film having digitally encoded information adjacent each frame, comprising:

a light source for projecting light through the developed portrait film;

an image input device adjacent the film positioned to receive light from the light source which has passed through the developed portrait film for providing an image output representative of an image on the developed portrait film;

an image convertor circuit including an input connected to the image input device and a digital output wherein the image output from the image input device is converted into a digital format comprising a digitized image provided on the digital output;

code reader means for reading said digitally encoded information from said film and providing an output;

edit station means coupled to the digital output for receiving digitized images, determining a sequence for the digitized images in accordance with a predetermined order defined by said output of said code reader means and providing an edit station output; and printer means, coupled to the edit station means, for receiving the edit station output, converting the edit station output into an analog format and transferring the edit station output to an image recording medium whereby images transferred to the image recording medium are in the predetermined order.

2. The system of claim 1 including:

means for receiving an input representative of information related to the image on the portrait film;

means for creating a relational data base for images on the portrait film based upon information received by the means for receiving; and wherein the edit station means includes means for organizing the relational data base whereby the relational data base is representative of the predetermined order of the digitized images.

3. The system of claim 1 wherein the printer means includes:

light transmissive means positioned adjacent the image recording medium for selectively changing light transmissive characteristics based upon the digitized image; and a light source adjacent the light transmissive means which projects light through light transmissive means and onto the image recording medium.

4. The system of claim 3 including means for mapping color density information based upon sensitivity of the image recording medium.

5. The system of claim 1 wherein the edit station means includes input means for receiving an input representative of said predetermined order.

6. A portraiture printer system for printing portrait images produced from film previously exposed by a portraiture camera and developed, the portraiture printer system comprising:

means for receiving digitally encoded information from the film associated with a portrait image of a subject on the film and providing an information output;

an image input device for receiving a portrait image of the subject from the exposed and developed film and providing a portrait output representative of the portrait image;

means for digitally processing the portrait output based upon the information output and providing a processed output; and a printer operatively positioned relative to an image recording medium and connected to the means for digitally processing, whereby portrait images derived from the processed output are transferred to the image recording medium.

7. The portraiture printer system of claim 6 wherein the means for digitally processing comprises means for selecting a sequence for portrait images based upon the information output provided by the means for receiving information.

8. The portraiture printer system of claim 6 wherein the means for digitally processing comprises:

means for receiving a plurality of images; and means for grouping a plurality of individual images based upon the information output provided by the means for receiving information whereby a composite image is provided by the processed output.

9. The portraiture printer system of claim 6 wherein the portrait images are carried on an exposed and developed portrait film and the image input device comprises:

means for scanning the exposed and developed portrait film and providing an analog output representative of images carried on the exposed and developed portrait film; and analog-to-digital converter means for converting the analog output into a digital format.

10. The portraiture printer system of claim 9 wherein the means for scanning has a plurality of spectral sensitivity ranges and the image input device includes a crosstalk elimination filter means for separating spectral content of the portrait film into the plurality of spectral sensitivity ranges.

11. The portraiture printer system of claim 9 wherein the analog-to-digital converter has a dynamic range and the image input device further includes means for matching the dynamic range of the analog-to-digital converter with a dynamic range of the portrait film.

12. The portraiture printer system of claim 6 wherein the encoded information is associated with the subject during exposure of portrait images by the portraiture camera.

13. The portraiture printer system of claim 6 wherein the means for digitally processing includes means for introducing text into the processed output.

14. The portraiture printer system of claim 6 wherein the means for digitally processing includes means for introducing graphics into the processed output.

15. A portraiture printer system for receiving portrait images of a plurality of subjects previously recorded on film and associated with encoded information relating to each of the portrait images by a portraiture camera, the portraiture printer system comprising:

image input means for receiving portrait images from the film and providing an image output representative of portrait images and signals representative of said encoded information;

an edit station coupled to the image input means including:

means for receiving a plurality of portrait images from the image output;

means for receiving a manual input; and means responsive to the manual input and said signals for grouping a plurality of portrait images together to form a composite image; and a printer connected to the edit station for printing the composite image on an image recording medium.

16. The portraiture printer system of claim 15 wherein the edit station includes means for introducing text into the composite image.

17. The portraiture printer system of claim 15 wherein the edit station includes means for introducing graphics into the composite image.

18. The portraiture printer system of claim 15 including:

information input means for receiving subject information related to portrait images received by the image input means; and wherein the means for grouping comprises means for grouping a plurality of portrait images together based upon the subject information to form the composite image.

* * * * *